United States Patent
Mueller et al.

(10) Patent No.: US 12,475,441 B2
(45) Date of Patent: Nov. 18, 2025

(54) APPLICATION PROGRAMMING INTERFACE INTEGRATION

(71) Applicant: Truist Bank, Charlotte, NC (US)

(72) Inventors: Mary Margaret Mueller, Charlotte, NC (US); Jamie Nathaniel Franklin, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 200 days.

(21) Appl. No.: 18/065,937

(22) Filed: Dec. 14, 2022

(65) Prior Publication Data
US 2024/0202675 A1 Jun. 20, 2024

(51) Int. Cl.
*G06Q 20/02* (2012.01)
*G06F 9/54* (2006.01)
*G06Q 20/04* (2012.01)

(52) U.S. Cl.
CPC ............ *G06Q 20/027* (2013.01); *G06F 9/54* (2013.01); *G06Q 20/04* (2013.01)

(58) Field of Classification Search
None
See application file for complete search history.

(56) References Cited

U.S. PATENT DOCUMENTS

| | | | | |
|---|---|---|---|---|
| 6,615,258 B1 * | 9/2003 | Barry | ...... | H04M 15/00 707/E17.107 |
| 9,721,268 B2 * | 8/2017 | Bondesen | ............. | G06Q 20/36 |
| 11,113,688 B1 * | 9/2021 | Ho | ............. | G06Q 20/3223 |
| 11,972,413 B2 * | 4/2024 | Shrivastava | ....... | G06Q 30/0207 |
| 2004/0228279 A1 * | 11/2004 | Midtun | ................. | H04L 69/329 370/236 |
| 2007/0173251 A1 * | 7/2007 | Vikberg | ............. | H04W 12/082 370/328 |
| 2009/0215448 A1 * | 8/2009 | Vikberg | ................. | H04W 8/04 455/433 |
| 2012/0011567 A1 * | 1/2012 | Cronk | ............. | H04N 21/25875 726/28 |
| 2013/0151400 A1 * | 6/2013 | Makhotin | .......... | G06Q 20/3229 705/39 |
| 2015/0004949 A1 * | 1/2015 | Fienberg | ........... | H04M 3/42136 455/414.1 |

(Continued)

FOREIGN PATENT DOCUMENTS

WO WO-2014210227 A1 * 12/2014 ......... G06Q 20/3672

*Primary Examiner* — Neha Patel
*Assistant Examiner* — Jahed Ali
(74) *Attorney, Agent, or Firm* — Michael A. Springs, Esq.; Shumaker, Loop & Kendrick, LLP; Patrick B. Horne (57) ABSTRACT

Systems and methods receive, via a user interface of a user device, at a hypertext document of a first digital platform of a first entity input(s) to link to a digital program of a second entity, the receiving triggering performing a cross-platform communication event via an API with the digital program of the second entity. A digital display of the digital program of the second digital platform is automatically provided, via the user interface, the providing facilitating data entry to the digital program of the second digital platform. It is determined that a user has completed the data entry to the digital program of the second digital platform, the determining triggering a redirection to the hypertext document of the first digital platform of the first entity, and the hypertext document of the first digital platform of the first entity is displayed, via the user interface.

20 Claims, 5 Drawing Sheets

(56) References Cited

U.S. PATENT DOCUMENTS

| | | | | |
|---|---|---|---|---|
| 2016/0358199 | A1* | 12/2016 | Van Os | G06Q 20/40 |
| 2016/0364721 | A1* | 12/2016 | Deliwala | G06Q 20/36 |
| 2018/0068312 | A1* | 3/2018 | Kim | G06Q 20/227 |
| 2018/0096345 | A1* | 4/2018 | Salama | H04W 12/47 |
| 2018/0211248 | A1* | 7/2018 | Sims | G06Q 20/3672 |
| 2018/0253705 | A1* | 9/2018 | Spector | G06Q 20/326 |
| 2018/0349888 | A1* | 12/2018 | Dao | G06Q 30/0233 |
| 2020/0151689 | A1* | 5/2020 | Dao | G06Q 20/105 |
| 2021/0149693 | A1* | 5/2021 | Yang | G06Q 50/01 |
| 2021/0192519 | A1* | 6/2021 | Mchugh | G06Q 20/36 |
| 2021/0279699 | A1* | 9/2021 | Royyuru | G06Q 20/3672 |
| 2021/0287194 | A1* | 9/2021 | Arumugam | G06Q 20/401 |

* cited by examiner

APPLICATION PROGRAMMING INTERFACE INTEGRATION

FIELD

This invention is related generally to the field of an application programming interface, and more particularly embodiments of the invention relate to application programming interface integration.

BACKGROUND OF THE INVENTION

Many companies invest time and resources to build, maintain, and improve mobile applications and websites to support and improve commercial activity. Mobile applications and websites are traditionally very service specific, which can lead to limited functions and capabilities. One such limitation is a lack of versatility between systems and companies, which can lead to inefficient payment processes. For example, individuals may have preferred online payment methods or payment sources, but it can be cumbersome to utilize or integrate these various payment methods or payment sources. Some of these inconveniences have been alleviated with advances to digital wallets, which allow customers to make electronic transactions with various entities by transferring digital currency units for goods and services. For example, users may submit credit card information or bank account information on a digital wallet website so that purchases can be made using the digital wallet. Various digital wallet services and platforms exist in the marketplace today and are often utilized to make both online purchases and in-store purchases.

In order to set up a digital wallet, the process often still suffers from a lack of versatility between the digital wallet service provider and the payment source entities. Often, users may need to gather numerous credit card numbers, debit card numbers, bank account numbers, etc. along with various other information in order to set up the digital wallets so that they can make payments. This process can be time consuming, inconvenient, and inefficient. Thus, a need exists in the art for improved systems and methods for improving account set up for various digital wallet service providers.

BRIEF SUMMARY

Shortcomings of the prior art are overcome and additional advantages are provided through the provision of a computing system for application programming interface integration. The system includes, for instance, a memory, one or more processors in communication with the memory, and program instructions executable by the one or more processors via the memory. Execution of the program instructions includes, in part, receiving, via a user interface of a user device, one or more inputs to link to a digital program of a second entity, the one or more inputs being received at a hypertext document of a first digital platform of a first entity, the receiving triggering a cross-platform communication event via an application programming interface with the digital program of the second entity. Also, the cross-platform communication event is performed, where the performing includes accessing, via a network, the application programming interface that communicatively integrates the first digital platform of the first entity with a second digital platform of the second entity. Further, a digital display of the digital program of the second digital platform is automatically provided, via the user interface, the providing facilitating data entry to the digital program of the second digital platform. Additionally, it is determined that a user has completed the data entry to the digital program of the second digital platform, the determining triggering a redirection to the hypertext document of the first digital platform of the first entity. The hypertext document of the first digital platform of the first entity is also displayed, via the user interface.

Additionally, disclosed herein is a computing system for application programming interface integration, where the system includes a memory, one or more processors in communication with the memory, and program instructions executable by the one or more processors via the memory. The program instructions are configured to, in part, detects that a user is accessing, via a digital merchant platform displayed via a user interface of a user device, a digital wallet that stores payment information of one or more payment sources. Further, the program instructions are configured to determine that the user intends to utilize a payment source of a third party that is not included in the one or more payment sources, the determining triggering a cross-platform communication event via an application programming interface with the third party. The program instructions are also configured to perform the cross-platform communication event, the performing including accessing, via a network, the application programming interface that communicatively integrates the digital wallet with a website of the third party. Additionally, the program instructions are configured to provide, via the user interface of the user device, an input mechanism for receiving authentication to access, via the website, the payment source of the third party. Also, the program instructions are configured to authenticate, via the input mechanism, the user, the authenticating triggering adding to the digital wallet third party payment information associated with the payment source, and redirect, based on the third party payment information being added, from the website of the third party to the digital wallet, the digital wallet having stored the third party information associated with the payment source as part of the payment information of the one or more payment sources.

Also disclosed herein is a computer-implemented method for application programming interface integration. The computer-implemented method includes receiving, via a user interface of a user device, one or more inputs to link to a digital program of a second entity, the one or more inputs being received at a hypertext document of a first digital platform of a first entity, the receiving triggering a cross-platform communication event via an application programming interface with the digital program of the second entity. Additionally, the method includes performing the cross-platform communication event, the performing including accessing, via a network, the application programming interface that communicatively integrates the first digital platform of the first entity with a second digital platform of the second entity. The method also includes automatically providing, via the user interface, a digital display of the digital program of the second digital platform, the providing facilitating data entry to the digital program of the second digital platform. Further, the method includes determining that a user has completed the data entry to the digital program of the second digital platform, the determining triggering a redirection to the hypertext document of the first digital platform of the first entity. The method includes displaying, via the user interface, the hypertext document of the first digital platform of the first entity.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

Figure 1:
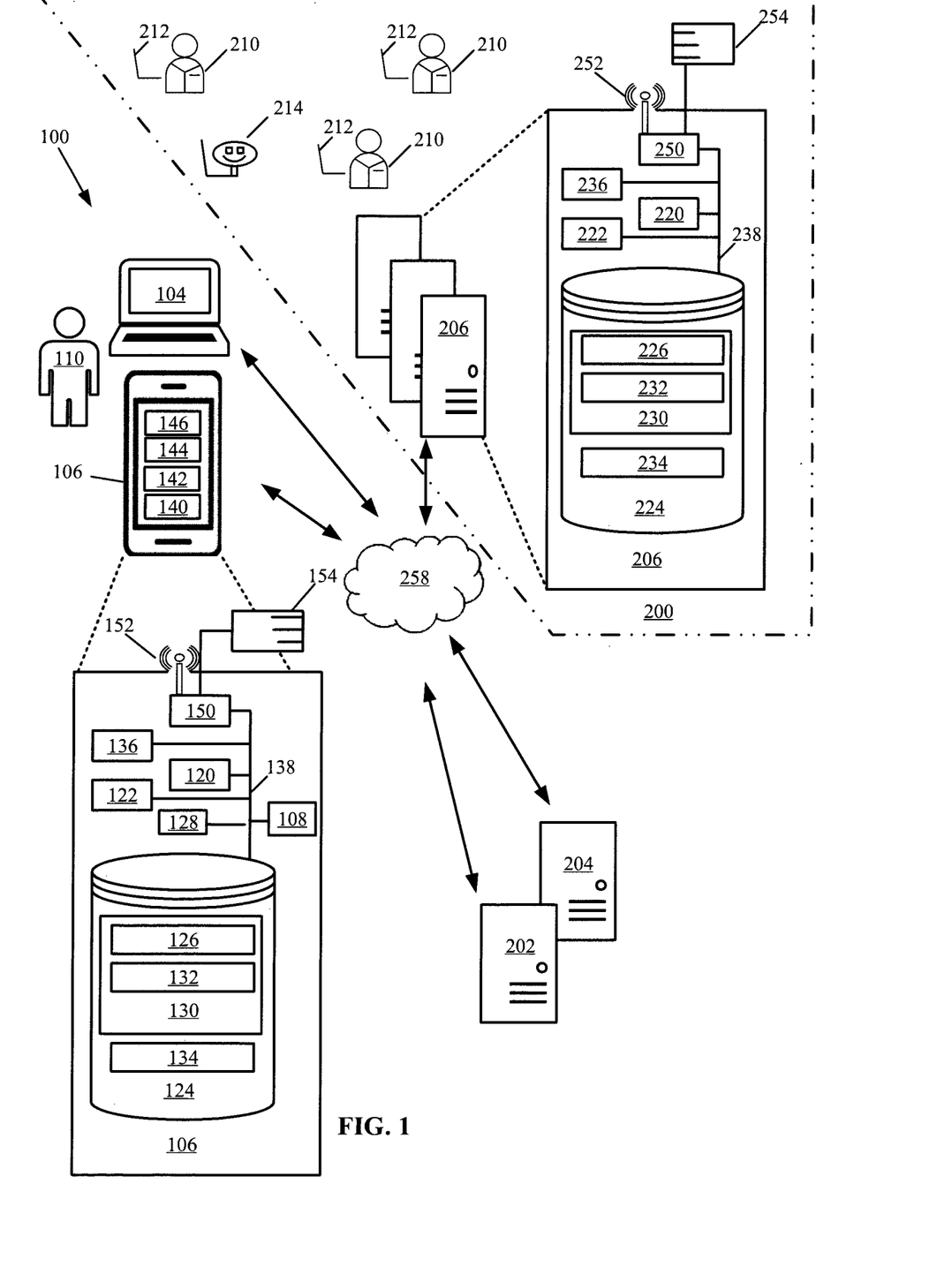
FIG. 1 illustrates an enterprise system and environment thereof for application programming interface integration, in accordance with an embodiment of the present invention.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

An application programming interface (API) is a set of programming instructions that enable direct communication between one software application (e.g., a website or mobile application) and another. The API allows one software application to get another software application to perform various tasks. Multiple types of APIs exist such as, for example, representational state transfer (REST) APIs, simple object access protocol (SOAP) APIs, remote procedure call (RPC) APIs, browser APIs, and iOS/Android APIs. APIs can be used to integrate payments, SMS/VOIP and email into various applications using a few lines of code. Specifically, APIs communicate through a set of rules to access information from multiple applications.

According to one embodiment, the API may provide and/or distribute code to various entities to enable websites of these entities to temporarily be redirected to a website of another entity. The code may include instructions or executable code that when executed cause a first website to either redirect to a second website or to display the second website via an overlay or iframe. In one embodiment, the API process may allow for website source code of a first website to be embedded into the source code of the second website to enable the second website to redirect back to the first website. According to one embodiment, the API process may make a request to a uniform resource locator (URL) for a webpage of the second website, where the URL may be translated to an IP address of a webserver of the second entity. In response, the webserver of the second entity may provide the webpage of the second entity to the user device. The user device may execute the source code of the webpage of the second entity in order to display the second entity's webpage. According to various embodiments, the code may include instructions for the user device to connect to the service provider system of the second entity and thereby communicate with the service provider system of the second entity to send various information. According to one embodiment API integration between the first and second entity may include a trigger that automatically updates data in applications from both entities in response to updates to an application of only one of the entities.

According to one embodiment, the API process may incorporate a push/pull process. For instance, the server may push information provided via a website of the first entity and pull information from the second entity. Advantageously, the push API may enable the financial institution to minimize server load since there are frequent data exchanges and real-time data processing. The server may automatically and instantly push new information that is obtained. The push API allows the webpage to communicate with a server of the second entity as soon as information is received rather than waiting for the user to open a webpage of the second entity. According to one embodiment, the push API process may incorporate a transmission control protocol (TCP)/internet protocol (IP) WebSocket that pushes data through a connection that is continuously open. Once the push API is initiated based on receiving information to be associated with the second entity, the computing system then performs a pull API where the computing system requests information from a server of the second entity. The information that may be pulled from the server of the second entity may include static information that is stored in the server of the second entity. For instance, the pull API may utilize a REST API request may include query parameters to retrieve various data for to add a payment source from the second entity.

Figure 2:
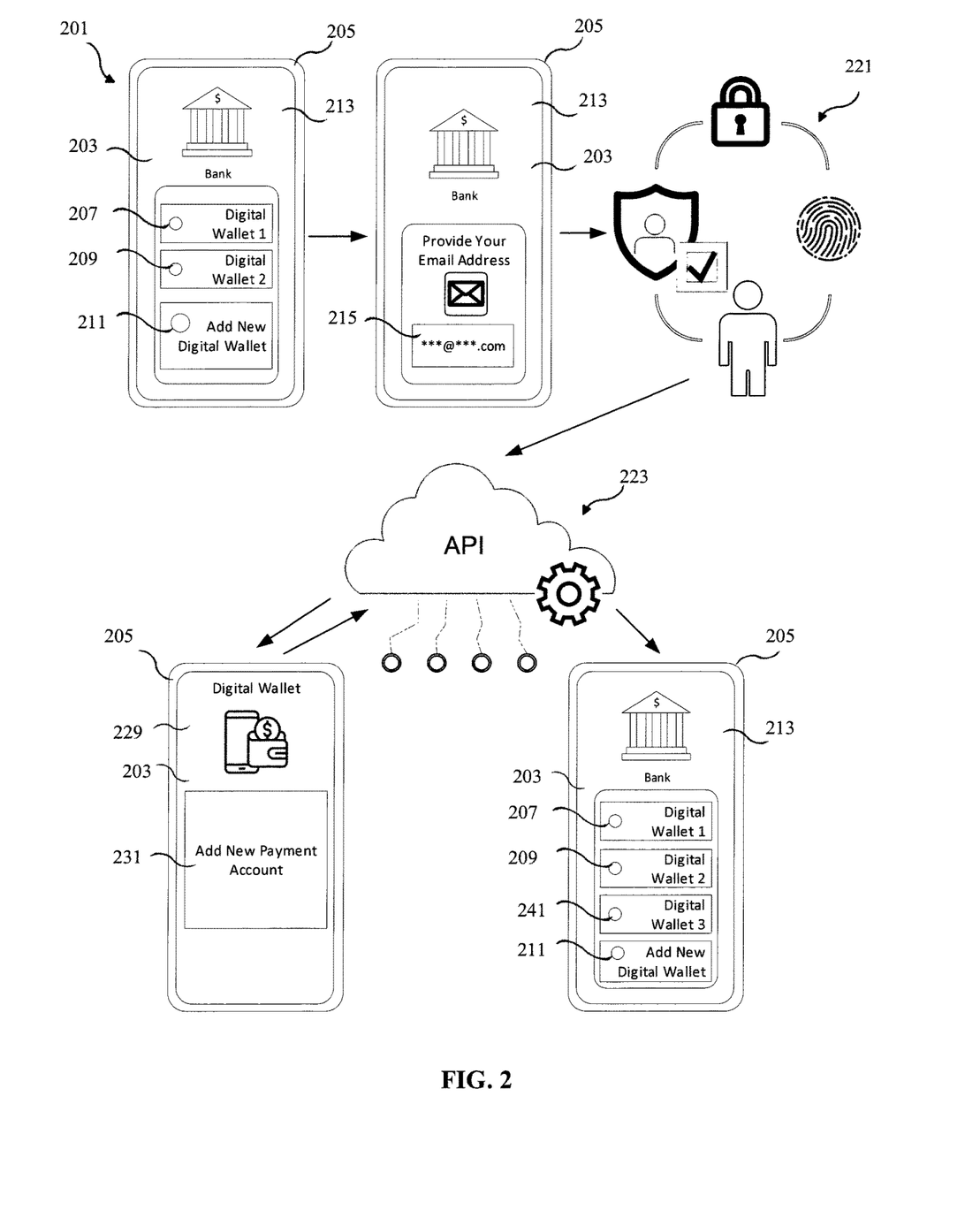
FIG. 2 depicts an example use case of a system for application programming interface integration, in accordance with an embodiment of the present invention.

FIG. 2 depicts an example use case of a system 201 for application programming interface integration, in accordance with an embodiment of the present invention. A user using a user device 205 may provide one or more inputs via a user interface 203. The inputs may be provided via a webpage 213 of a financial institution. For example, the webpage 213 may list a number of digital wallets of service providers such as, for example, Apple Pay®, Google Pay®, Samsung Pay®, PayPal®, etc. According to one embodiment, the webpage 213 may include a drop-down menu or a list of common digital wallet service providers that may be individually selected by the user. The webpage 213 may include various actionable inputs for each digital wallet such as, for example, digital wallet 1 input 207 and digital wallet 2 input 209. The webpage 213 may also include a new digital wallet input 211 that allows the user to associate a new digital wallet account with their payment source or specific financial account. Once the user indicates that a new digital wallet should be added by for example, selecting the new digital wallet input 211, the computing system may display, via the webpage 213 of the financial institution, an actionable input mechanism to provide authentication information. For example, the user may provide the email address associated with their digital wallet account of the specific digital wallet service provider. Once the authentication information is provided, the computing system may perform an authentication process 221 to authenticate the user and to determine which digital wallet is associated with that user.

Once the user's digital wallet is identified, a cross-platform communication event is performed via an API 223 that integrates the website of the financial institution with a website of the digital wallet. This process results in a digital display 229 of the digital wallet being displayed via the user interface 203 of the user device 205. The digital display 229 may optionally include one or more actionable inputs 231 facilitating data entry to the digital wallet. In particular, selection of the actionable inputs 231 may allow the user to automatically associate the payment source of the financial institution with the digital wallet. Specifically, data necessary to perform a purchase using the payment source may be automatically transferred to the digital wallet. According to another embodiment, the actionable input may just be a selectable confirmation button to confirm that the user wants to add the payment source to their digital wallet. Information about their payment source may also be displayed via the digital display 229 such as, for example, a name of the financial institution, an account number, the type of account (e.g. checking account, debit card account, etc.). Once the user has confirmed that the information is correct by selecting the confirmation button, the payment source may be automatically added to their digital wallet and the user may be redirected or otherwise returned to the webpage 213 of the financial institution. The user interface 203 may then display the webpage 213 with a new digital wallet option 241 that is now associated with the user's financial account.

Figure 3:
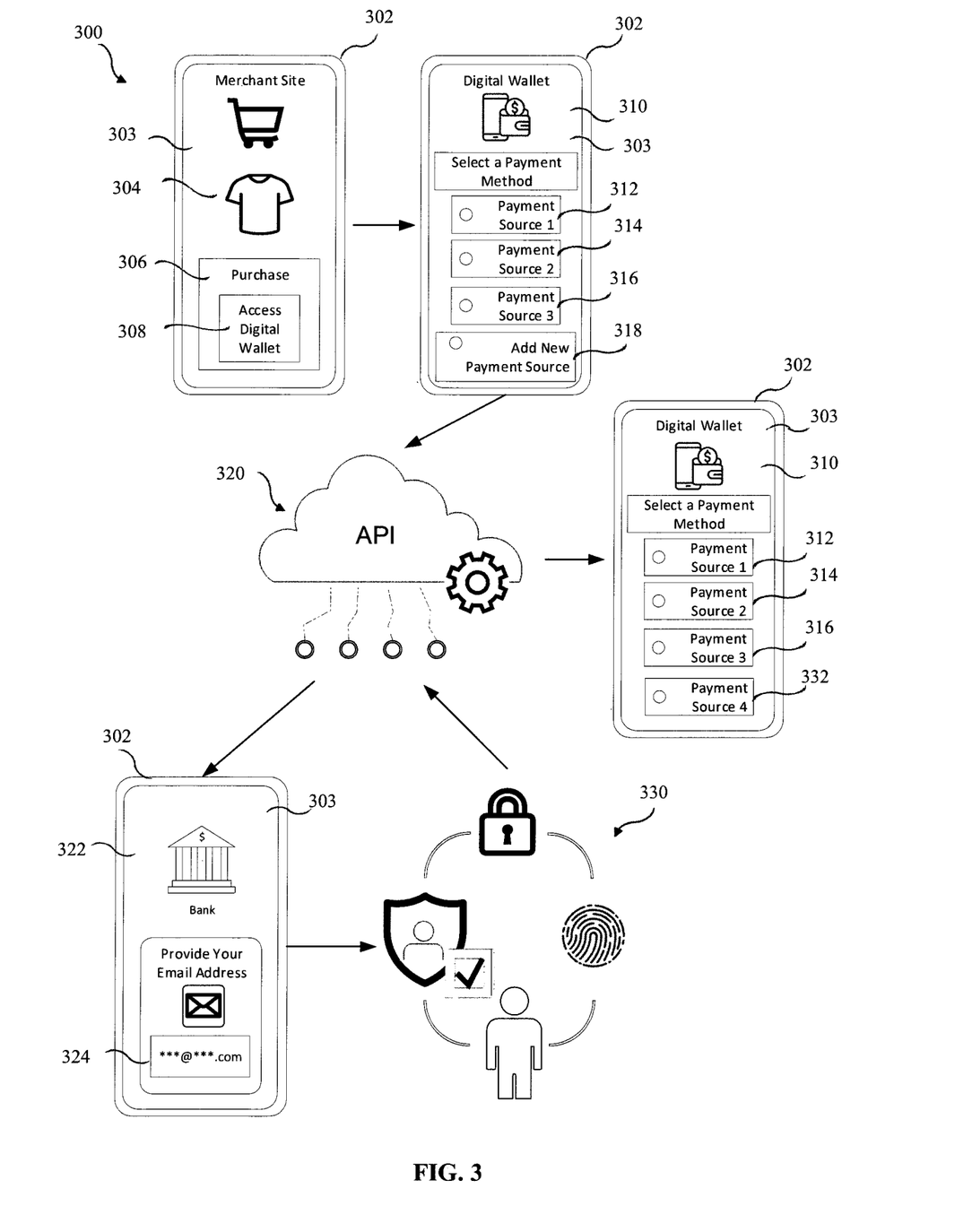
FIG. 3 depicts an example use case of a system for application programming interface integration, in accordance with an embodiment of the present invention.

FIG. 3 depicts an example use case of a system 300 for application programming interface integration, in accordance with an embodiment of the present invention. A purchaser can initiate a purchase using a mobile device 302. In some embodiments, the mobile device 302 can be near field communication (NFC) enabled and the purchase can be initiated using NFC. Specifically, a user may interact with the user interface 303 of the mobile device 302 by tapping, scanning, capturing an image (e.g., scanning a barcode, a stock keeping unit (SKU), a quick response (QR) code, or other image), tapping a NFC sticker, etc. to identify the product to be purchased.

In other embodiments, the purchase may be an online purchase made on an online website. In order to make the purchase, the customer may see a checkout or payment page indicating the product 304 to be purchased. The payment page may also indicate, in one example, a total payment amount for the purchase, which may include taxes, shipping costs, or other costs. The payment page may also include a selectable input 306 to purchase the product 304 and may allow the user to select a payment source or to access a digital wallet via, for example, a selectable digital wallet input 308. Once the digital wallet input 308 is selected, the computing system may perform an authentication process to access the digital wallet. For instance, the authentication process may require the user to input a user name, email address, phone number, password, personal identification number (PIN), capture an image of the user's face, etc. In other embodiments, the user may already be authenticated or signed in to their digital wallet account, so a digital wallet webpage 310 may automatically be displayed via the user interface 303. At the digital wallet webpage 310, the user may select one or more payment sources using, for example, payment source 1 input 312, payment source 2 input 314, or payment source 3 input 316, which select payment sources already saved to the digital wallet. Additionally, the digital wallet webpage 310 may also include a new payment source input 318 to add a new payment source. This new payment source may include, for example, a debit card, a credit card, a bank account, a cryptocurrency account, or various other account types that have financial resources that the user can use to purchase the product 304.

If the desired payment source is not listed on the digital wallet webpage 310, the user can select the new payment source input 318. According to one embodiment, the new payment source input may indicate the type of payment source or an entity affiliated with the payment source. For instance, the new payment source input 318 may be associated with a specific credit card company, a specific bank, or other financial institution or entity. Once selected, a cross-platform communication event may be triggered and data is transmitted through an API 320 so that the necessary data can be obtained for the new payment source. Advantageously, the various requests and responses exchanged through the API allows for integrating the digital wallet with a website of a financial institution. Specifically, a webpage 322 of the financial institution may automatically be displayed via the user interface 303. The webpage 322 may allow a user to input authentication information such as, for example, an email address, via a selectable input 324 that can be used to authenticate, via an authentication mechanism 330, the user. Once the user is authenticated, this may automatically enable information of the payment source associated with the financial institution to be added to the user's digital wallet. The computing system may then automatically redirect the user interface 303 to the digital wallet webpage 310 from the webpage 322 of the financial institution. As a result of this process, a new input, such as a payment source 4 input 332, may now be displayed via the digital wallet webpage 310 on the user interface 303 of the mobile device 302.

Figure 4:
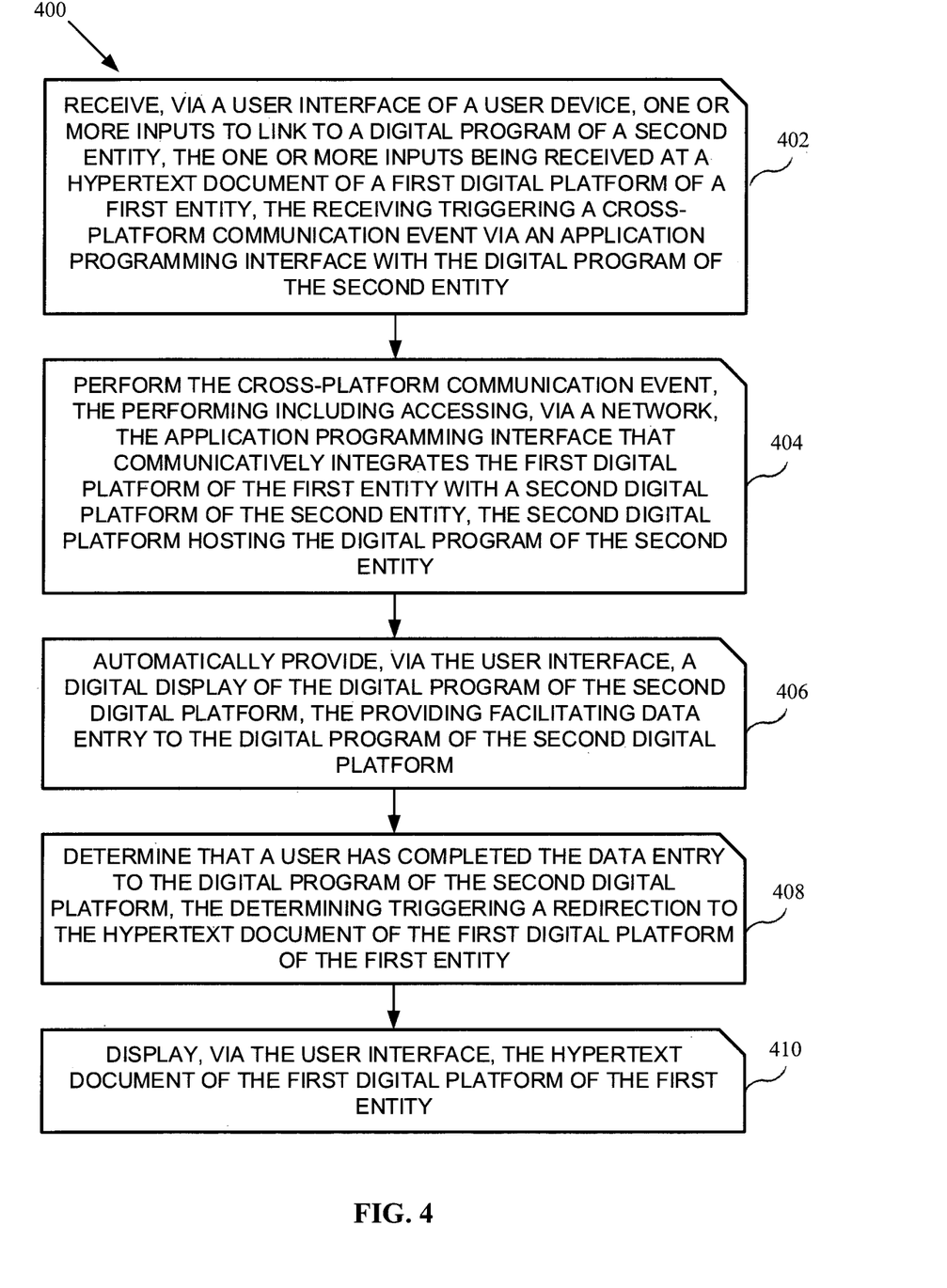
FIG. 4 depicts a block diagram of an example method for application programming interface integration, in accordance with an embodiment of the present invention.

FIG. 4 depicts a block diagram of an example method 400 for application programming interface integration, in accordance with an embodiment of the present invention. At block 402, the computing system receives, via a user interface of a user device, one or more inputs to link to a digital program of a second entity, the one or more inputs being received at a hypertext document (e.g., webpage) of a first digital platform of a first entity, the receiving triggering a cross-platform communication event via an application programming interface with the digital program of the second entity. According to one embodiment, the hypertext document (e.g., webpage) of the first digital platform of the first entity includes a webpage of a financial entity's website. The webpage may include, for example, an external payment gateway. A payment gateway may be operated, for example, by a financial institution or credit card company. The external payment gateway may be displayed via an external payment gateway aggregator that bundles up multiple payment source options that can be selected. For example, the external payment gateway may list an aggregation various digital wallets with which the payment sources are linked or otherwise associated. Additionally, the first entity may include a financial institution and the digital program of the second entity may include a digital wallet.

Once the user accesses their online account with their financial institution, one of the webpages associated with the financial institution may display account information about a payment source associated with the user. This account information may include a list of the digital wallets that are linked to this specific financial account number. Specifically, the digital wallet options may be displayed via the user interface of the user device. The digital wallet service providers may include, for example, Apple Pay®, Google Pay®, Samsung Pay®, PayPal®, or various other digital wallet applications available. The webpage may also include an option to associate another digital wallet to this specific financial account number. Data associated with the digital wallet applications may be stored on one or more devices of the digital wallet service providers, or alternatively the user device may host data of the digital wallet.

In one embodiment, the computing system may prompt the user to associate the specific financial account number to a specific digital wallet application. For instance, the user's email address or other identifying information or data that is stored in a database or other storage facility of the financial institution may overlap with information that was provided to a digital wallet application service provider when the digital wallet was set up. The database may include information that corresponds to user information of one or more users of the financial institution. For example, the database may include financial information, user authentication information, user preferences, digital wallet connection information, user's transactional information history, etc. The database may be stored in a memory or other storage device of the financial institution. Based on there being a common email address for both the digital wallet and the financial institution, a webpage of the financial institution may display an option to set up the digital wallet with one or more payment sources. In other examples, the system may display a prompt to associate one or more payment sources with the digital wallet that was determined to have a common email address.

According to various embodiments, the user may simultaneously associate multiple specific financial account numbers of multiple payment sources to a single digital wallet application. For instance, the user may have recently set up an account with a digital wallet application but may not have associated any of their financial payment sources with a specific financial entity to that digital wallet application. When the user logs in to their personal account on the financial entity's website, they may then decide to select multiple payment sources to be associated with the digital wallet application.

According to one embodiment, the one or more inputs include user authentication information necessary to access the digital program. Specifically, the one or more inputs may include a user's email address, username, phone number, password, personal identification number (PIN), a capture an image of the user's face, the thumbprint, etc. In particular, the email address may include an email address of the user that is associated with the digital program of the second entity so that the digital wallet application service provider is able to determine which digital wallet to associate with the user. According to one embodiment, the computing system may automatically attempt to associate a digital wallet account with one or more email accounts that are associated with the user and stored by the financial entity. If the automatic attempt to associate the digital wallet account with stored email accounts, the computing system may request that the user input the email address associated with their digital wallet.

According to one embodiment, if the user inputs an email address that is determined, by the computing system, not to be associated with any existing digital wallet accounts of a specific digital wallet application service, the webpage of the financial institution may display, via the user interface, selectable inputs to either re-enter their email address, provide different authentication information (e.g., facial recognition), or set up a new account with the specific digital wallet application service.

At block 404, the computing system performs the cross-platform communication event, the performing including accessing, via a network, the API that communicatively integrates the first digital platform of the first entity with a second digital platform of the second entity. In particular, the API integrates the website of the financial institution with the website for the digital wallet application service provider. At block 406, the computing system automatically provides, via the user interface, a digital display of the digital program of the second digital platform, the providing facilitating data entry to the digital program of the second digital platform. In particular, the digital display of the digital wallet of the digital wallet service provider may be automatically provided in order to allow the user to input data into the digital wallet in order to associate their payment source (e.g., specific financial account) with the digital wallet such that their bank account can now be used to make purchases via the digital wallet. For instance, according to one embodiment, the data entry provided to the digital program (e.g., digital wallet) of the second digital platform includes payment information of a payment account that is established with the first entity.

According to one embodiment, the cross-platform communication event may include generating the digital display of the digital program, where the digital display includes a graphical embedded element that includes user customization characteristics. For instance, the user customization characteristics may include, for example, elements specifically associated with the user account such as the account number, account name, user identifier, a user image, account balances, etc.

According to one embodiment, integrating the first digital platform of the first entity with the second digital platform of the second entity includes incorporating an inline frame (iframe) of another hypertext document (e.g., webpage) of the second digital platform of the second entity within the hypertext document of the first digital platform of the first entity. The iframe may be deployed or generated based on the integration of the API. The iframe may be hosted or generated by the second entity and may provide a rendering of a hypertext document (e.g., webpage) of the second entity's digital platform (e.g., website).

According to another embodiment, providing the digital display may include overlaying, via a website overlay, the digital program of the second entity on top of the hypertext document of the first digital platform of the first entity such that the webpage of the digital wallet is overlaid over the webpage of the financial institution.

At block 408, the computing system determines that a user has completed the data entry to the digital program of the second digital platform, the determining triggering a redirection to the hypertext document of the first digital platform of the first entity. At block 410, the computing system displays, via the user interface, the hypertext document of the first digital platform of the first entity. According to one embodiment, the data entry to the digital program of the second digital platform includes a selection of the graphical embedded element, wherein the graphical embedded element includes an actionable element to add payment account information of the user pulled from the first digital platform of the first entity to the digital program of the second entity.

Figure 5:
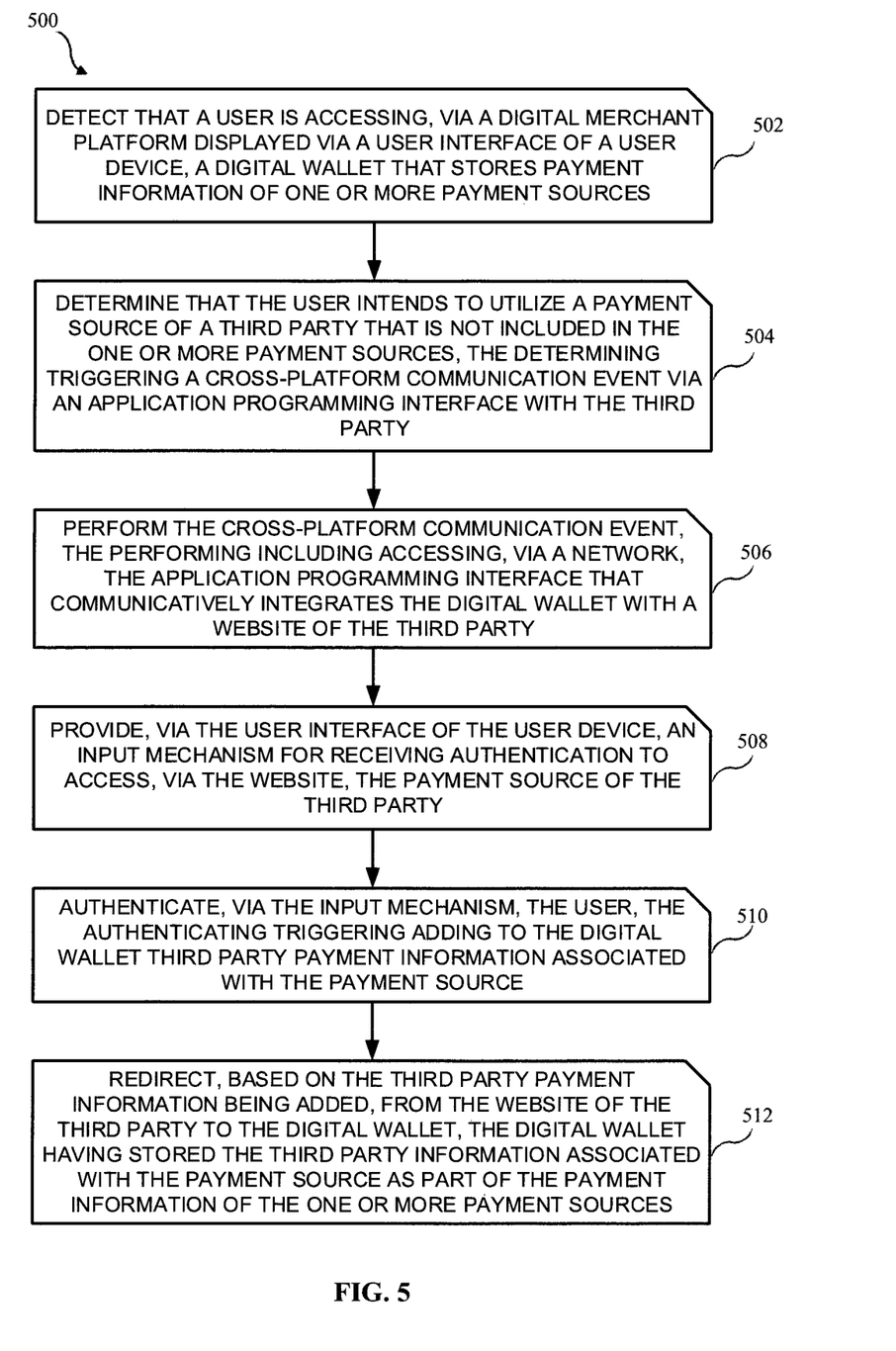
FIG. 5 depicts a block diagram of an example method for application programming interface integration, in accordance with an embodiment of the present invention.

FIG. 5 depicts a block diagram of an example method 500 for application programming interface integration, in accordance with an embodiment of the present invention. At block 502, the computing system detects that a user is accessing, via a digital merchant platform displayed via a user interface of a user device, a digital wallet that stores payment information of one or more payment sources. According to various embodiments, the digital wallet may be hosted locally via the user device or may be hosted remotely by a service provider system using a remote server of a merchant. For instance, the digital wallet information of the digital wallet may be stored by an online merchant account associated with the user.

According to one embodiment, the computing system detects that the user is accessing the digital wallet based on the user selecting an actionable element at a checkout page of the digital merchant platform. Specifically, the actionable element initiates a purchase of one or more items via the digital merchant platform. For instance, the user may select input to purchase a product using their digital wallet.

At block 504, the computing system determines that the user intends to utilize a payment source of a third party that is not included in the one or more payment sources, the determining triggering a cross-platform communication event via an application programming interface with the third party. For instance, the user may select an input to use a different payment source that is not saved to their digital wallet.

At block 506, the computing system performs the cross-platform communication event, the performing including accessing, via a network, the application programming interface that communicatively integrates the digital wallet with a website of the third party. Through the API, the digital wallet can transmit various data such as, for example, information about the specific digital wallet application, information about the digital wallet account of the user, etc.

At block 508, the computing system provides, via the user interface of the user device, an input mechanism for receiving authentication to access, via the website, the payment source of the third party. In particular, the input mechanism may include various authentication processes or methods.

At block 510, the computing system authenticates, via the input mechanism, the user, the authenticating triggering adding to the digital wallet third party payment information associated with the payment source. For instance, the authentication process can authenticate the user using, for example, a user's email address, username, phone number, password, personal identification number (PIN), a capture an image of the user's face, the thumbprint, etc. At block 512, the computing system redirects, based on the third party payment information being added, from the website of the third party to the digital wallet, the digital wallet having stored the third party information associated with the payment source as part of the payment information of the one or more payment sources. In particular, the computing system may redirect to the webpage of the digital wallet from the webpage of the financial institution.

Aspects of the present invention are described herein with reference to flowchart illustrations and/or block diagrams of computer-implemented methods and computing systems according to embodiments of the invention. It will be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus (the term "apparatus" includes systems and computer program products). The processor may execute the computer readable program instructions thereby creating a means for implementing the actions specified in the flowchart illustrations and/or block diagrams. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the actions specified in the flowchart illustrations and/or block diagrams. In particular, the computer readable program instructions may be used to produce a computer-implemented method by executing the instructions to implement the actions specified in the flowchart illustrations and/or block diagrams.

The computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computing system for application programming interface integration, the computing system comprising:
   a memory;
   one or more processors in communication with the memory; and
   program instructions executable by the one or more processors via the memory to:
      receive, via a user interface of a user device, one or more inputs to link to a digital program of a digital wallet service provider identified from the one or more inputs, the one or more inputs being received at a hypertext document of a first digital platform of a financial institution, the receiving triggering a cross-platform communication event via an application programming interface (API) with the digital program of the digital wallet service provider, the cross-platform communication event including a push-pull process that enables a first server of the first digital platform to automatically and instantly push new information to a second server of the digital program of the digital wallet service provider as soon as the new information is received and the first server pulling additional information associated with query parameters from the second server;
      access, via a network, the API that communicatively integrates the first server of the first digital platform of the financial institution with the second server of the digital program of the digital wallet service provider;
      perform the cross-platform communication event to minimize server load through frequent data exchanges and real-time data processing using an internet protocol (IP) WebSocket connection between the financial institution and the digital wallet service provider that is continuously open rather than waiting for a webpage of the digital wallet service provider to open;
      integrate the first digital platform of the financial institution with a second digital platform of the digital wallet service provider by incorporating an inline frame of another hypertext document of the second digital platform of the digital wallet service provider within the hypertext document of the first digital platform of the financial institution;
      automatically provide, via the user interface, a digital display of the digital program of the second digital platform of the digital wallet service provider, the providing facilitating data entry to the digital program of the second digital platform of the digital wallet service provider;
      receive, via the user interface, the data entry, wherein the data entry includes authentication of the user to access the digital program of the second digital platform of the digital wallet service provider;
      in response to determining that the data entry to the digital program of the second digital platform of the digital wallet service provider is successful, trigger a redirection from the digital program of the second digital platform of the digital wallet service provider to the hypertext document of the first digital platform of the financial institution;
      display, via the user interface, the hypertext document of the first digital platform of the financial institution; and
      receive a request to associate a bank account of the financial institution with a digital wallet of the digital wallet service provider and based thereon, connect the bank account to the digital wallet such that the bank account is usable to make purchases via the digital wallet.

2. The computing system for application programming interface integration according to claim 1, wherein the hypertext document of the first digital platform of the financial institution includes an external payment gateway, the external payment gateway may be displayed via a payment gateway aggregator.

3. The computing system for application programming interface integration according to claim 1, wherein the one or more inputs include user authentication information necessary to access the digital program of the digital wallet service provider.

4. The computing system for application programming interface integration according to claim 1, wherein the user authentication information includes an email address of the user that is associated with the digital program of the digital wallet service provider.

5. The computing system for application programming interface integration according to claim 1, wherein the cross-platform communication event including generating the digital display of the digital program of the digital wallet service provider, the digital display including a graphical embedded element comprising user customization characteristics.

6. The computing system for application programming interface integration according to claim 5, wherein the data entry to the digital program of the second digital platform of the digital wallet service provider includes a selection of the graphical embedded element, wherein the graphical embedded element includes an actionable element to add payment account information of the user pulled from the first digital platform of the financial institution to the digital program of the digital wallet service provider.

7. The computing system for application programming interface integration according to claim 1, wherein the providing the digital display includes overlaying, via a website overlay, the digital program of the digital wallet service provider on top of the hypertext document of the first digital platform of the financial institution.

8. The computing system for application programming interface integration according to claim 1, wherein the data entry to the digital program of the second digital platform of the digital wallet service provider includes payment information of a payment account that is established with the financial institution.

9. A computer-implemented method for optimizing storage utilization, the computer-implemented method comprising:
receiving, via a user interface of a user device, one or more inputs to link to a digital program of a digital wallet service provider identified from the one or more inputs, the one or more inputs being received at a hypertext document of a first digital platform of a financial institution, the receiving triggering a cross-platform communication event via an application programming interface (API) with the digital program of the digital wallet service provider, the cross-platform communication event including a push-pull process that enables a first server of the first digital platform to automatically and instantly push new information to a second server of the digital program of the digital wallet service provider as soon as the new information is received and the first server pulling additional information associated with query parameters from the second server;
accessing, via a network, the API that communicatively integrates the first server of the first digital platform of the financial institution with the second server of the digital program of the digital wallet service provider;
performing the cross-platform communication event to minimize server load through frequent data exchanges and real-time data processing using an internet protocol (IP) WebSocket connection between the financial institution and the digital wallet service provider that is continuously open rather than waiting for a webpage of the digital wallet service provider to open;
integrating the first digital platform of the financial institution with a second digital platform of the digital wallet service provider by incorporating an inline frame of another hypertext document of the second digital platform of the digital wallet service provider within the hypertext document of the first digital platform of the financial institution;
automatically providing, via the user interface, a digital display of the digital program of the second digital platform of the digital wallet service provider, the providing facilitating data entry to the digital program of the second digital platform of the digital wallet service provider;
receiving, via the user interface, the data entry, wherein the data entry includes authentication of the user to access the digital program of the second digital platform of the digital wallet service provider;
in response to determining that the data entry to the digital program of the second digital platform of the digital wallet service provider is successful, trigger a redirection from the digital program of the second digital platform of the digital wallet service provider to the hypertext document of the first digital platform of the financial institution;
displaying, via the user interface, the hypertext document of the first digital platform of the financial institution; and
receiving a request to associate a bank account of the financial institution with a digital wallet of the digital wallet service provider and based thereon, connect the bank account to the digital wallet such that the bank account is usable to make purchases via the digital wallet.

10. The computer-implemented method for optimizing storage utilization of claim 9, wherein the hypertext document of the first digital platform of the financial institution includes an external payment gateway, the external payment gateway may be displayed via a payment gateway aggregator.

11. The computer-implemented method for optimizing storage utilization of claim 9, wherein the one or more inputs include user authentication information necessary to access the digital program of the digital wallet service provider.

12. The computer-implemented method for optimizing storage utilization of claim 9, wherein the user authentication information includes an email address of the user that is associated with the digital program of the digital wallet service provider.

13. The computer-implemented method for optimizing storage utilization of claim 9, wherein the cross-platform communication event including generating the digital display of the digital program of the digital wallet service provider, the digital display including a graphical embedded element comprising user customization characteristics.

14. A non-transitory computer-readable storage medium, the computer- readable storage medium including instructions that, when executed by a processor, cause the processor to:
receive, via a user interface of a user device, one or more inputs to link to a digital program of a digital wallet service provider identified from the one or more inputs, the one or more inputs being received at a hypertext document of a first digital platform of a financial institution, the receiving triggering a cross-platform communication event via an application programming interface (API) with the digital program of the digital wallet service provider, the cross-platform communication event including a push-pull process that enables a first server of the first digital platform to automatically and instantly push new information to a second server of the digital program of the digital wallet service provider as soon as the new information is received and the first server pulling additional information associated with query parameters from the second server;

access, via a network, the API that communicatively integrates the first server of the first digital platform of the financial institution with the second server of the digital program of the digital wallet service provider;

perform the cross-platform communication event to minimize server load through frequent data exchanges and real-time data processing using an internet protocol (IP) WebSocket connection between the financial institution and the digital wallet service provider that is continuously open rather than waiting for a web page of the digital wallet service provider to open;

integrate the first digital platform of the financial institution with a second digital platform of the digital wallet service provider by incorporating an inline frame of another hypertext document of the second digital platform of the digital wallet service provider within the hypertext document of the first digital platform of the financial institution;

automatically provide, via the user interface, a digital display of the digital program of the second digital platform of the digital wallet service provider, the providing facilitating data entry to the digital program of the second digital platform of the digital wallet service provider;

receive, via the user interface, the data entry, wherein the data entry includes authentication of the user to access the digital program of the second digital platform of the digital wallet service provider;

in response to determining that the data entry to the digital program of the second digital platform of the digital wallet service provider is successful, trigger a redirection from the digital program of the second digital platform of the digital wallet service provider to the hypertext document of the first digital platform of the financial institution;

display, via the user interface, the hypertext document of the first digital platform of the financial institution; and receive a request to associate a bank account of the financial institution with a digital wallet of the digital wallet service provider and based thereon, connect the bank account to the digital wallet such that the bank account is usable to make purchases via the digital wallet.

15. The computer-readable storage medium of claim 14, wherein the hypertext document of the first digital platform of the financial institution includes an external payment gateway, the external payment gateway may be displayed via a payment gateway aggregator.

16. The computer-readable storage medium of claim 14, wherein the one or more inputs include user authentication information necessary to access the digital program of the digital wallet service provider.

17. The computer-readable storage medium of claim 14, wherein the user authentication information includes an email address of the user that is associated with the digital program of the digital wallet service provider.

18. The computer-readable storage medium of claim 14, wherein the cross-platform communication event including generating the digital display of the digital program of the digital wallet service provider, the digital display including a graphical embedded element comprising user customization characteristics.

19. The computer-readable storage medium of claim 18, wherein the data entry to the digital program of the second digital platform of the digital wallet service provider includes a selection of the graphical embedded element, wherein the graphical embedded element includes an actionable element to add payment account information of the user pulled from the first digital platform of the financial institution to the digital program of the digital wallet service provider.

20. The computer-readable storage medium of claim 14, wherein the providing the digital display includes overlaying, via a website overlay, the digital program of the digital wallet service provider on top of the hypertext document of the first digital platform of the financial institution.

* * * * *